(12) United States Patent
Sharp et al.

(10) Patent No.: US 11,305,523 B2
(45) Date of Patent: Apr. 19, 2022

(54) HOLDING DEVICE FOR HOLDING A NECKED TUBULAR OBJECT IN A PRINTING SYSTEM AND METHOD OF LOADING AND UNLOADING OBJECT

(71) Applicant: TONEJET LIMITED, Royston (GB)

(72) Inventors: John Lawton Sharp, Cambridge (GB); Ian Philip Butler Ingham, Cambridge (GB); Jeffrey Mark Woods, Cambridge (GB)

(73) Assignee: Tonejet Limited, Melbourn (GB)

( * ) Notice: Subject to any disclaimer, the term of this patent is extended or adjusted under 35 U.S.C. 154(b) by 273 days.

(21) Appl. No.: 16/346,214

(22) PCT Filed: Nov. 2, 2017

(86) PCT No.: PCT/EP2017/078034
§ 371 (c)(1),
(2) Date: Apr. 30, 2019

(87) PCT Pub. No.: WO2018/083162
PCT Pub. Date: May 11, 2018

(65) Prior Publication Data
US 2019/0263110 A1 Aug. 29, 2019

(30) Foreign Application Priority Data

Nov. 2, 2016 (EP) .................................... 16196961
Nov. 2, 2016 (EP) .................................... 16196962
(Continued)

(51) Int. Cl.
*B41J 3/407* (2006.01)
*B41F 17/18* (2006.01)
(Continued)

(52) U.S. Cl.
CPC ............ *B41F 17/002* (2013.01); *B41F 17/18* (2013.01); *B41F 17/20* (2013.01); *B41J 3/4073* (2013.01);
(Continued)

(58) Field of Classification Search
CPC ....... B41F 17/002; B41F 17/18; B41J 3/4073; B41J 3/40731; B41J 3/40733;
(Continued)

(56) References Cited

U.S. PATENT DOCUMENTS 3,075,800 A * 1/1963 Rowekamp ............. B65B 21/12
294/194
4,340,249 A * 7/1982 Bucklew ................... B66C 1/54
294/195
(Continued)

FOREIGN PATENT DOCUMENTS

CN 2801474 Y 8/2006
CN 101128288 A 2/2008
(Continued)

OTHER PUBLICATIONS

International Search Report and Written Opinion in Appl. No. PCT/EP2017/078034 dated Dec. 8, 2017, 14 pages.
(Continued)

*Primary Examiner* — Leslie J Evanisko
(74) *Attorney, Agent, or Firm* — Kowert, Hood, Munyon, Rankin & Goetzel, P.C.

(57) ABSTRACT

A printing system for printing on an outer surface of a tubular object is provided. The printing system comprises at least one printing station for printing on the outer surface of the tubular object (100); and at least one holding device for holding the tubular object during a printing process. The holding device comprises: a substantially annular gripper ring (200) adapted to be partially inserted into a tubular
(Continued)

object. The gripper ring comprises a radially compressible portion (201) configured to securely engage with an inner surface of the tubular object. The radially compressible portion exerts a radially outward mechanical restoring force when compressed.

22 Claims, 6 Drawing Sheets

(30) Foreign Application Priority Data

Nov. 2, 2016 (EP) .................................. 16196963
Nov. 2, 2016 (EP) .................................. 16196965

(51) Int. Cl.
*B41F 17/00* (2006.01)
*B41F 17/20* (2006.01)
*F16D 27/01* (2006.01)
*B41J 11/00* (2006.01)

(52) U.S. Cl.
CPC ......... *B41J 3/40733* (2020.08); *B41J 11/002* (2013.01); *F16D 27/01* (2013.01)

(58) Field of Classification Search
CPC ..... B65B 21/12; B65B 21/18; B41P 2217/61; B41P 2217/60; B25J 15/0047
USPC .......................................................... 294/93
See application file for complete search history.

(56) References Cited

U.S. PATENT DOCUMENTS

| | | | |
|---|---|---|---|
| 5,282,888 A * | 2/1994 | Fukawa | ............... B05C 3/09 |
| | | | 118/423 |
| 2007/0222245 A1 * | 9/2007 | Maffeis | ............... B25J 15/12 |
| | | | 294/93 |
| 2016/0023471 A1 | 1/2016 | Jeter | |

FOREIGN PATENT DOCUMENTS

| | | | | |
|---|---|---|---|---|
| CN | 101351340 A | 1/2009 | | |
| CN | 102596579 A | 7/2012 | | |
| CN | 203221723 U | 10/2013 | | |
| CN | 203557814 U | 4/2014 | | |
| CN | 103935115 A | 7/2014 | | |
| CN | 204249539 U | 4/2015 | | |
| CN | 105008133 A | 10/2015 | | |
| DE | 4131327 A1 * | 3/1993 | ............ | B65G 47/90 |
| DE | 202004019382 U1 | 2/2005 | | |
| DE | 102016101256 A1 * | 7/2017 | .......... | B65G 47/908 |
| FR | 2528016 | 12/1983 | | |
| FR | 2528016 A1 * | 12/1983 | .......... | B41F 17/002 |
| GB | 1014187 | 12/1965 | | |
| JP | 57-100071 A | 6/1982 | | |
| JP | 60-94355 A | 5/1985 | | |
| JP | 2012-511429 A | 5/2012 | | |
| JP | 2014-058142 A | 4/2014 | | |
| JP | 2014058142 A | 4/2014 | | |
| WO | 2014076704 | 5/2014 | | |

OTHER PUBLICATIONS

Office Action in Chinese Appl. No. 201780066930.9 dated Jul. 31, 2020, 11 pages.
Office Action in JP Appl. No. 2019-517885 dated Aug. 23, 2021, 5 pages.

* cited by examiner

HOLDING DEVICE FOR HOLDING A NECKED TUBULAR OBJECT IN A PRINTING SYSTEM AND METHOD OF LOADING AND UNLOADING OBJECT

The present invention provides a printing system for printing onto tubular objects and a device for holding necked tubular objects. Also provided is a method for loading necked tubular objects onto the holding device and a method for unloading necked tubular objects from the holding device.

BACKGROUND

There are existing apparatuses for printing on beverage cans and other cylindrical objects such as aerosol cans, tubes, bottles and other such containers. During known printing procedures, the containers are conveyed and rotated through a number of processing stations where they undergo various processes, such as printing, drying, coating and curing.

The devices used to hold and manipulate the containers during these procedures generally comprise a holding device that allows the containers to be held and supported without obscuring any of part of the container's surface onto which ink is to be printed.

One example of a known type of holding device is a vacuum mandrel comprising a internal support onto which the container is held by suction. A vacuum is used to hold an internal surface of the base of a container to the end of the mandrel and has to be maintained for the entire time that the container is required to be held by the mandrel. Such mandrels may be adapted for use with necked cans (US2016/0023471) or un-necked cans (JP2014058142).

Another known type of holding device is described in EP1782951 and comprises an expanding mandrel, designed to support an un-necked cylindrical can internally using moveable segments that move radially outwards by a vacuum-operated mechanism to increase the diameter of the mandrel to press against the internal surfaces of the can. Again, the vacuum has to be maintained for the entire time that the can is required to be held by the mandrel.

DE202004019382 describes an expansion mandrel for holding parallel-sided tubes, which has a feed of compressed air that expands an elastic sleeve under internal air pressure to hold the tube.

Known holding devices all require services which include at least a source of power, commonly in the form of vacuum or compressed air, to retain the container on the support throughout processing. The provision of these services to a moveable holding device requires complex connections, especially on printing apparatuses which typically employ a large number of holding devices. Permanent supply connections to the holding devices require the use of rotating couplings, unions etc., and limit the possible designs of the printing machine to simple geometries such as mandrel wheels, reciprocating linear tracks, etc. These print machine geometries are not, in general, the most efficient possible geometries in terms of total throughput (number of containers printed per unit time) or total size of the apparatus. In order to provide print machine systems having improved throughput and size efficiency, it is desirable to have a moving holding device that is able to support and manipulate a container or other tubular object without the need for complex connections to a power supply, vacuum supply, compressed air supply, or any other such service.

SUMMARY OF INVENTION

According to a first aspect of the invention, a printing system for printing on an outer surface of a tubular object is provided. The printing system comprises: at least one printing station for printing on the outer surface of the tubular object; at least one holding device for holding the tubular object during a printing process, the holding device comprising: a substantially annular gripper ring adapted to be partially inserted into a tubular object, the gripper ring comprising a radially compressible portion configured to securely engage with an inner surface of the tubular object, wherein the radially compressible portion exerts a radially outward mechanical restoring force when compressed.

The provision of printing system comprising a holding device comprising a radially compressible gripper ring that secures a tubular object with a mechanical restoring force enables a printing process in which an object can be supported and carried during a printing process without requiring permanent electrical connections, vacuum supplies or air supplies. This allows efficient printing apparatuses to be provided without the design constraints imposed by requiring permanent connections to holding devices.

Furthermore, the passive mechanical nature of the holding mechanism means that the manufacturing and operating costs of the holding device are low compared to known holding devices.

Preferably, the gripper ring comprises an annular base, and the radially compressible portion of the gripper ring comprises a plurality of fingers that extend axially from the annular base, whereby radial compression of the plurality of fingers causes each of the fingers to bend towards the central axis of the annular gripper ring.

Preferably, each of the plurality of fingers comprises a leading portion having an outer radius that tapers from a maximum radius at a boundary region to a minimum radius at its end and shaped such that, when an opening of a tubular object is axially pushed over the tapered leading portion, a force exerted by the opening of the tubular object on the tapered leading portion causes the radially compressible portion to be progressively compressed.

In a second aspect of the invention, a holding device for holding a necked tubular object is provided. The holding device comprises: a substantially annular gripper ring, the gripper ring comprising an annular base and a plurality of fingers that extend axially from the annular base, wherein each of the plurality of fingers comprises: a first portion extending axially from base of the gripper ring up to a boundary region, and a second portion extending axially from the first portion and connected to the first portion at the boundary region; wherein, in its rest position, the maximum outer radius of each finger occurs at the boundary region between the first portion and the second portion such that, when an opening of a necked tubular object is axially pushed over the gripper ring, a force exerted by the opening of the necked tubular object on the second portion of each finger causes each finger to be progressively bent inwards towards the axis of the gripper ring until the opening of the necked tubular object has passed over the boundary region, whereupon each finger resiliently springs radially outwards such that an outer surface of the second portion contacts an inner surface of the necked tubular object.

The provision of a gripper ring comprising axially extending fingers with first and second portions having a maximum outer radius at their boundary provides a gripper ring that is initially progressively compressed when inserted into the opening of a necked tubular object and then subsequently expands outwards to engage the inner surface of the necked tubular object. This allows such a tubular object to be easily loaded onto the gripper ring and secured without the need for any electrical connections, vacuum supplies or air supplies.

Preferably, in its rest position, the front of the gripper ring is tapered whereby the outer radius of the second portion of each finger decreases in an axial direction from a maximum outer radius at the boundary region to a minimum outer radius at its end.

Preferably, the gripper ring is necked whereby, in its rest position, the outer radius of the first portion of each finger varies in an axial direction from a minimum outer radius adjacent to the base to a maximum outer radius at the boundary region.

Preferably, the outer surface of the first portion of each of the plurality of fingers is shaped such that engagement with an inner surface of the necked tubular object produces a force having an axial component that urges the necked tubular object towards the base of the gripper ring.

Preferably, the first and second portions of each finger are integrally formed.

Preferably, the gripper ring is mounted on a rotatable mandrel, with the gripper ring being coaxial with the axis of rotation of the mandrel.

Preferably, the rotatable mandrel further comprises an adjustable end-stop against which the rim of the necked tubular object is held by the axial component of the force that urges the necked tubular object towards the base of the gripper ring.

Preferably, the rotatable mandrel further comprises: an interior axial channel in fluid communication with an opening in the annular base of the gripper ring; a gas inlet channel connecting the interior axial channel to the outside of the mandrel, thereby allowing compressed gas to be provided into the mandrel via the gas inlet channel in order to produce a displacing pressure at the base of the necked tubular object to eject the object from the gripper ring.

Preferably, the holding device further comprises a base support element disposed coaxially within the gripper ring, the base support element comprising a circular rim configured to slot into a circular channel at the base of the necked tubular object.

Preferably, the base support is mounted on a rotatable mandrel, with the circular rim of the base support element being coaxial with the axis of rotation of the mandrel, and wherein the rotatable mandrel further comprises: an interior axial channel in fluid communication with the first opening of the base support element; and a gas inlet channel connecting the interior axial channel to the outside of the mandrel; thereby allowing compressed gas to be provided into the mandrel via the gas inlet channel in order to produce a displacing pressure at the second opening of the base support element to displace the necked tubular object.

Preferably, the base support is mounted on a rotatable mandrel, with the circular rim of the base support element being coaxial with the axis of rotation of the mandrel.

Preferably, the base support element comprises a hollow cylindrical main body having a first opening at a first end and a second opening at a second end, wherein the second opening is defined by the circular rim.

Preferably, the necked tubular object is a necked metal monobloc container.

Preferably, the necked tubular object is a necked multipart container.

Preferably, the necked tubular object is a plastic container comprising an integrated neck portion and closed base.

Preferably, the holding device forms part of a carrying device configured to move objects between printing stations in a printing system.

Preferably, the holding device is one of a plurality of holding devices that each form part of one of a plurality of carrying devices, each of which is configured to be independently moved objects between printing stations in the printing apparatus.

In a third aspect of the invention, a method of loading a necked tubular object onto the holding device of the first aspect is provided. The method comprises: axially pushing the necked tubular object onto the gripper ring of the holding device with the necked tubular object being held in axial alignment with the gripper ring.

In a fourth aspect of the invention, a method of unloading a necked tubular object from the holding device the first aspect is provided, the method comprises: providing compressed gas into the inside of the necked tubular object, thereby causing an increased pressure on the base of the tubular object sufficient to overcome a retaining force provided by the gripper ring.

DETAILED DESCRIPTION OF THE INVENTION

The present invention provides a device for holding and supporting a necked tubular object for use in a printing apparatus. The retaining force that holds the tubular object in place is produced by the holding device with no external connection to a power supply or other such service.

Though the invention is optimised for use with necked monobloc containers such as beverage cans, the skilled person will understand that the principles disclosed herein are applicable to other necked tubular objects having sufficiently similar structural features to necked monobloc containers, including bottles, tubes and other such objects. A necked tubular object is an object that has a substantially cylindrical outer surface and comprises a tapered inner surface at a neck region in the vicinity of an opening of the object. Suitable containers include necked multipart containers such as aerosol cans having a separately formed base, and plastic containers comprising an integrated neck portion and closed base. Where the terms container, can, necked container or necked can are used in the specification, the skilled person shall understand that other objects having similar structural features may be used instead.

Before describing the present invention in detail, the structure of standard necked monobloc container suitable for use with the present invention is described by way of background.

Figure 1:
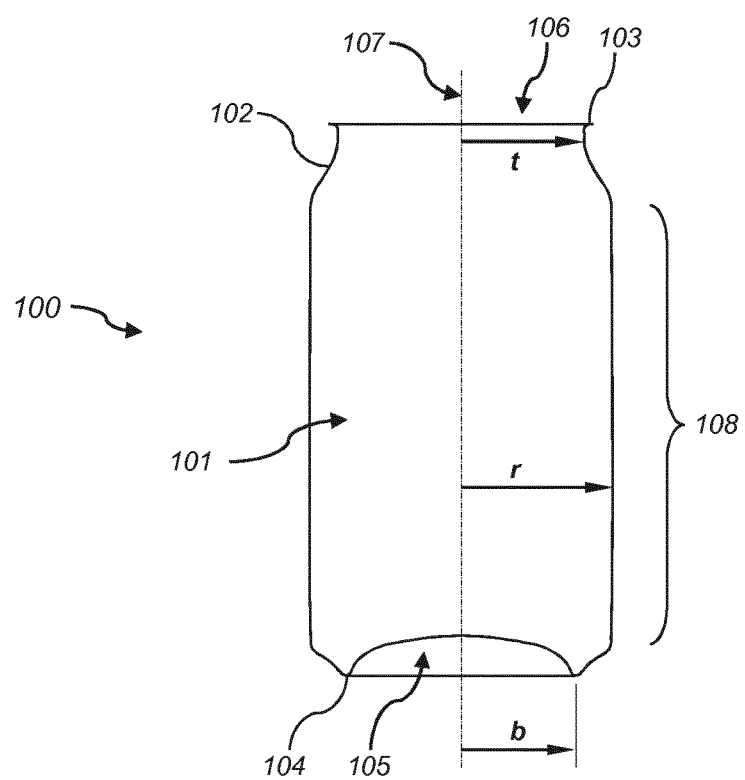
FIG. 1 shows a sectional view of a schematic representation of an example of a necked monobloc can suitable for use with embodiments of the invention.

FIG. 1 shows an example of a necked cylindrical metal monobloc container 100. The container 100 is shown in the form that it has during a printing process before being filled and sealed.

The container 100 is substantially cylindrical and is continuously symmetrical around a rotational axis 107. The container 100 comprises a main body 101 having a substantially constant internal radius, r, along a middle portion 108 that forms the majority of the container's length.

At a first, open, end of the container 100, the radius of the main body 101 tapers to a narrower neck portion 102, having an internal radius, t, smaller than that of the middle portion 108. The neck portion 102 terminates at a neck flange 103 that extends substantially radially from the neck portion 102 and has a substantially annular geometry. The neck flange 103 lies on a plane perpendicular to the axis 107 of the body 108 of the container. To seal the container 100 after being filled, the neck flange 103 is crimped with an interlocking lid portion (not shown). In its unsealed state, the neck portion 102 and neck flange 103 define an opening 106 into the enclosed volume of the container 100.

At a second, closed, end of the container 100, the main body 101 tapers to a protruding base ring 104, having a radius, b, smaller than the internal radius, r, of the middle portion 108 and smaller than internal radius, t, of the neck portion 102. The base ring 104 surrounds a concave domed portion 105 that closes the container 100 at the second end. The base ring 104 forms a circular channel defined on its inner circumference by the concave domed portion 105 of the container 100, and on its outer circumference by the tapered portion of the second end of the main body 101 of the container 100.

Such containers 100 are generally produced in a number of standard sizes including 33 cl and 50 cl, 12 oz and 16 oz. Many of these standard sizes have substantially the same radius, differing principally in the height of the body 108.

The holding device to be described in detail below comprises a gripper ring portion that provides axial and radial securing forces to retain a container 100 in a suitable position for printing. When inserted into the opening 106 of a container 100, the gripper ring is radially compressed in order to fit into the opening of the container 100, thereby producing a restoring force that acts against the inner surface of the neck region 102 of the container 100. The restoring force of the compressed gripped ring retains the container 100 in suitable position for printing without distortion of the cylindrical shape of the container body 101 which is to be printed. In some embodiments, the holding device further comprises a base support element that is adapted to engage the base of a container 100 when held by the gripper ring, thereby providing further support to the container 100 and increasing the axial alignment between the container 100 and the axis of the gripper ring.

In some embodiments, the holding device is connected to or forms part of a rotating mandrel and acts to couple containers 100 to the mandrel as part of a system for printing on containers.

Figure 2:
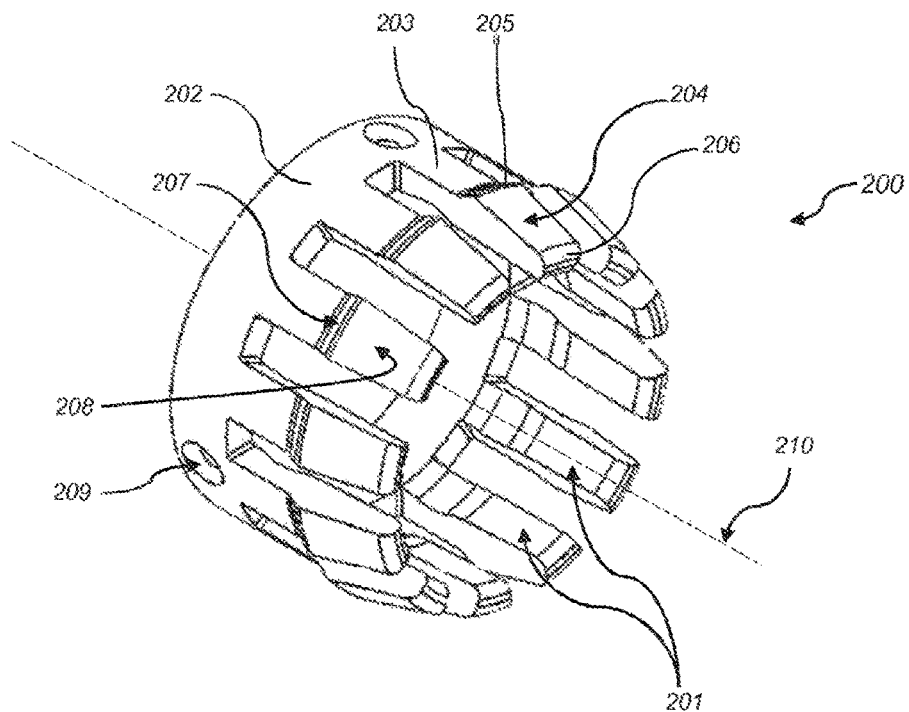
FIG. 2 shows a gripper ring according to a first embodiment of the invention.

FIG. 2 shows a gripper ring 200 according to one embodiment of the invention.

The gripper ring 200 has a substantially cylindrical geometry with a longitudinal axis 210. The gripper ring 200 comprises a base portion 202 having an annular cross-section and from which extend a plurality of axially extending fingers 201.

The plurality of axially extending fingers 201 may be radially compressed, causing each of the axially extending fingers 201 to bend towards the axis 210 of the gripper ring 200. The axially extending fingers 201 are formed of a material that, under certain deformations, exerts a restoring force towards its original shape. When the axially extended fingers 201 are bent towards the axis 210 of the gripper ring 200, a restoring force urges the fingers 201 away from the axis 210 towards their original orientation.

The base portion 202 comprises a plurality of holes 209 extending therethrough that allow the gripper ring 200 to be affixed to a handling device, such as a rotating mandrel, using screws or other such retaining elements that pass through the holes 209.

In the shown embodiment, the gripper ring 200 comprises twelve axially extending fingers 201 that are circumferentially spaced apart at a distance from their neighbouring fingers 201 that is approximately the same as the width of the fingers 201. The distances between neighbouring fingers 201 are the same for all of the fingers 201. Other embodiments may comprise a different number of axially extending fingers 201 and the axially extending fingers 201 may be spaced apart by a greater or lesser distance than their width.

Each axially extending finger 201 comprises a flat portion 203 extending axially from the base portion 202 of the gripper ring 200 and having a substantially rectangular cross-section but with the same radius of curvature on its outside surface as the base portion of the gripper ring 202. Extending axially from the flat portion 203 is a shaped portion 204 whose upper surface 207;208 is configured for engagement with a container 100 when the gripper ring 200 is axially inserted into the opening 106 of the container 100. The outer radius of at least part of each of the fingers 201 is greater than the radius of the opening of a container 100, requiring the fingers 201 to be inwardly compressed as the gripper ring 200 is inserted into the opening 106 of the container 100.

Figure 3:
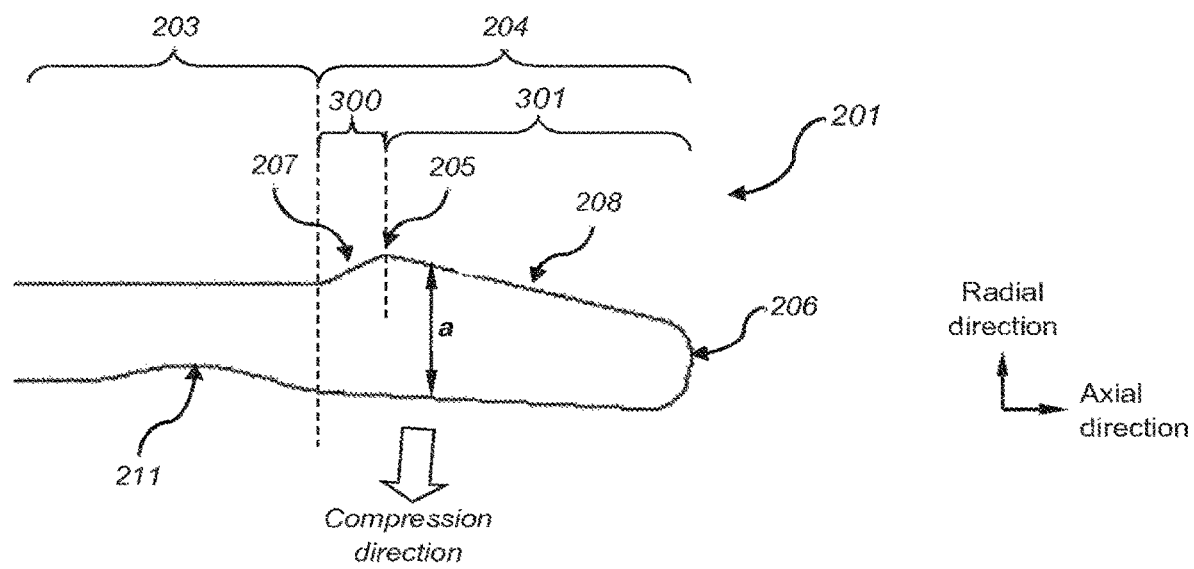
FIG. 3 shows a cross-sectional view of an axially extending finger of the gripper ring of FIG. 2.

The varying radius of the upper surface 207;208 of the axially extending fingers 201 can be seen in more clearly in FIG. 3, which shows a side-on view (or tangential cross-sectional view) of a single axially extending finger 201.

The axial cross section of the shaped portion 204 of each finger has a substantially constant width, but its radial thickness, a, varies along the length of the finger 201. As a container 100 is loaded onto the holding device, the container 100 contacts the gripper ring 200 along its outer surface; it is the outer profile of each finger 201, therefore, that defines the interaction between the container 100 and the gripper ring 200 in use. The bottom surface of each finger may comprise a scooped out portion 211 in order to provide the fingers 201 with the desired flexibility and resilience when the gripper ring is compressed radially.

The shaped portion 204 of each finger comprises a first portion 300 having a first (backwards facing) outer surface 207 and a second portion 301 having a second (forwards facing) outer surface 208. The two portions meet at a boundary 205, at which point the outer radius of the finger 201 is at a maximum.

The outer radius of the first portion 300 increases along the axial length of the finger 201 until it reaches a maximum radius at the boundary 205 between the first and the second portions. The outer surface 207 of the first portion 300 faces, to some extent, towards the base portion 202 of the gripper ring 200 and away from the direction from which a container 100 may be loaded onto the gripper ring 200. When a container 100 is loaded onto gripper ring 200, the outer surface 207 of the first portion 300 contacts the inner surface of a container 100. Preferably, the angle of the backward facing outer surface 207 with respect to the axis of the gripper ring 200 approximately matches the angle of the inner surface of the neck portion of a container 100.

The second portion 301 extends axially from the first portion 300 at the boundary 205. The outer radius of the second portion 208 decreases from a maximum radius at the boundary 205 between the first and the second portions to a narrow end 206. The outer surface 208 of the second portion 301 faces, to some extent, away from the flat portion 203 of each finger 201 and towards the direction from which a container 100 may be loaded onto the gripper ring 200.

Typically, in use, a container 100 is axially inserted over a stationary gripper ring 200. Contact between the outer surface 208 of the leading second portion 301 of each finger and the opening 106 of the container 100 forces the fingers 201 to be bent inwards. When the opening 106 of the container 100 passes the boundary region 205, the fingers are able to resiliently spring outwards, causing the outer surface 207 of the first portion 300 to engage the inner surface of the container and secure the container 100 to the gripper ring 200.

The outer radius of the base 202 and the flat portion 203 of the axially extending fingers 201 is similar to but slightly less than the inner radius, t, of the necked portion 102 of the container 100.

The maximum outer radius of the shaped second portion 204 (at the boundary between the first backward facing outer surface and the second forward facing outer surface) of each axially extending finger 201 is greater than the inner radius, t, of the neck portion of the container 100. The outer radius of the shaped second portion 204 at its narrow end 206 is less than the inner radius, t, of the neck portion of the container 100.

Figure 4A:
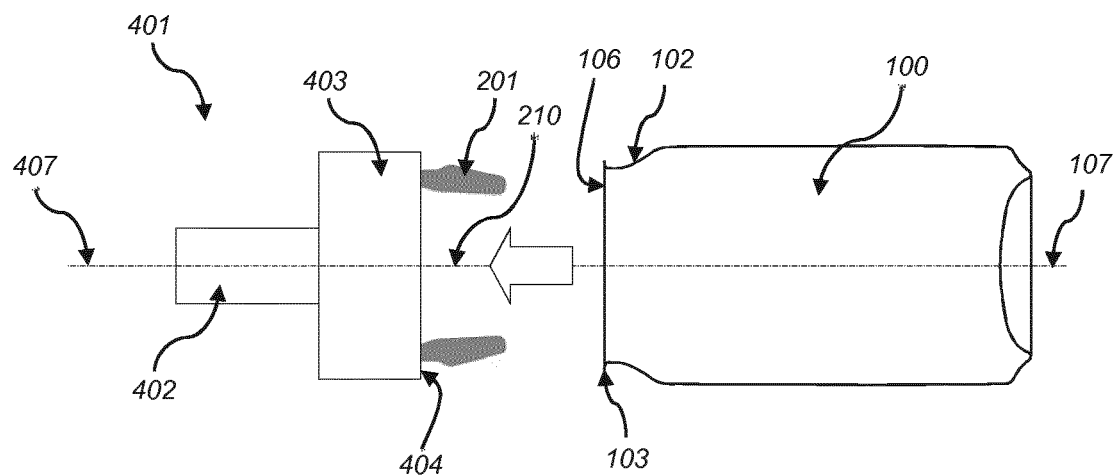
FIG. 4A shows a holding device comprising the gripper ring of FIG. 1 in an unloaded state.
Figure 4B:
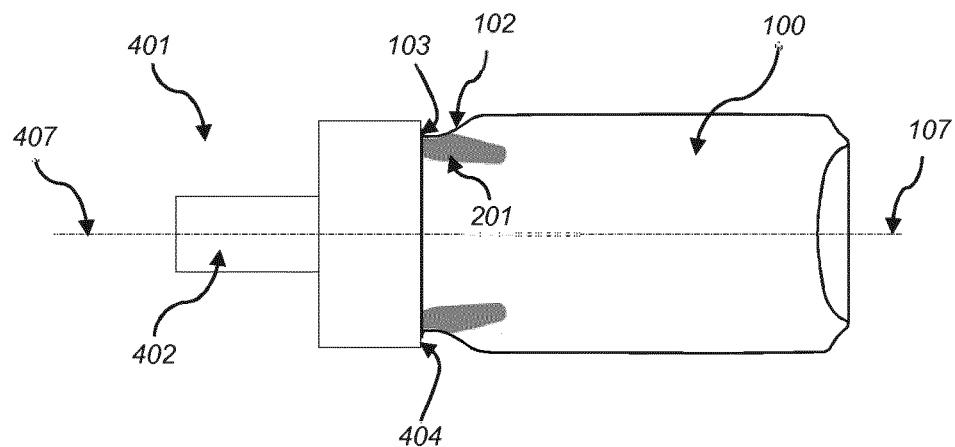
FIG. 4B shows the holding device of FIG. 4B in a loaded state.

FIGS. 4A and 4B show an example of the gripper ring 200 in use, both before engagement with a container 100 (FIG. 4A) and when engaged with a container 100 (FIG. 4B). In this embodiment, the gripper ring 200 is mounted on a rotatable mandrel 401 having an axis of rotation 407 and comprising a shaft portion 402 and a head portion 403. The base 202 of the gripper ring 200 is disposed coaxially within and secured to the head 403 of the mandrel 401.

The head 403 of the mandrel 401 has a radius that is greater than both the radius of the gripper ring base 202 and at least an inner radius the flange portion 103 of the container 100. The larger radius of the mandrel head 403 provides a shoulder portion 404 that lies radially outside the gripper ring 201 and against which the flange portion 103 of the container 100 may abut when the container 100 is held on the gripper ring 201.

To load the container 100 onto the gripper ring 200, the container 100 is aligned coaxially with the gripper ring 200 and pushed onto the gripper ring 200 in an axial direction such that at least part of each of the axially extending fingers 201 enters the opening 106 of the container 100.

As a container 100 is axially pushed onto the gripper ring 200, the forward facing outer surface 208 of each axially extending finger 201 contacts the neck 102 or flange 103 portion of the container 100, creating a radially compressing force on the forward facing outer surface 208. As the container 100 is pushed further onto the gripper ring 200, the radial compressing force causes the axially extending fingers 201 to bend radially inwards and the point of contact between the container 100 and the gripper ring 200 moves away from the narrow end 206 of each finger 201 towards the point of greatest outer radius at the boundary 205 between the first and second portions of each finger 201.

As the container 100 is axially pushed still further onto the gripper ring 200, the point of contact between the gripper ring 200 and the container 100 moves beyond the point of greatest outer radius of each finger 201 (i.e. the narrowest part of the container neck passes the widest part of the gripper ring). This allows the radially compressed fingers 201 of the container 100 to move radially outwards such that the backward facing surface 207 of the shaped portion 204 of each finger 201 contacts the inner surface of the neck portion 102 of the container 100. Because the axially extending fingers 201 are still radially compressed, the restoring tendency of each compressed finger 201 exerts a force on the inner surface of the necked region of the container 100 that is approximately normal to the backwards facing outer surface 207 of each finger 207. The axial component of this force acts to pull the container 100 further onto the gripper ring 200. The container 100 stops when its flange 103 abuts the shoulder 404 of the head 403 of the mandrel 401. At this point, the restoring forces of the compressed fingers 201 of the gripper ring 200 have the effect of holding the container 100 in place on the gripping ring 200 and maintaining axial alignment between the gripping ring 200 and the container 100.

Provided the flange 103 of the container 100 is formed perpendicular to and concentric to the axis 107 of the container 100, the container axis 107 will be held in coaxial alignment with the axis of rotation 407 of the mandrel 401 and gripper ring 200.

In this embodiment, the gripper ring 200 is formed from a polymer material, such as nylon, acetyl resin (e.g. Delrin produced by DuPont), or Polyethylene Terephthalate (PET). Other embodiments may be formed of different materials having sufficient resilience, including flexibility, density and hardness to provide adequate restoring spring forces for the purposes of the invention. Preferably, the material used is lightweight and compatible with the inside surface of the container such that it provides a low risk of abrading the inside surface of the container.

The gripper ring 200 may be conveniently manufactured using an additive manufacturing process such as 3D printing, or may be by a moulding process such as injection moulding, or may alternatively be machined from solid.

Figure 5:
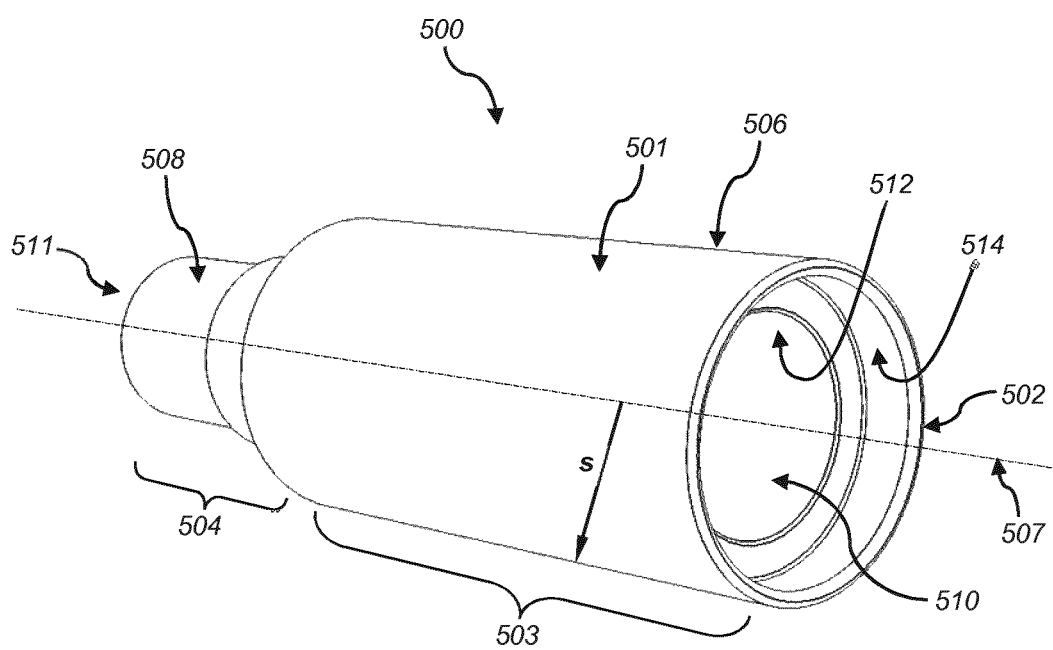
FIG. 5 shows a base support element for use in a second embodiment of the invention.
Figure 6A:
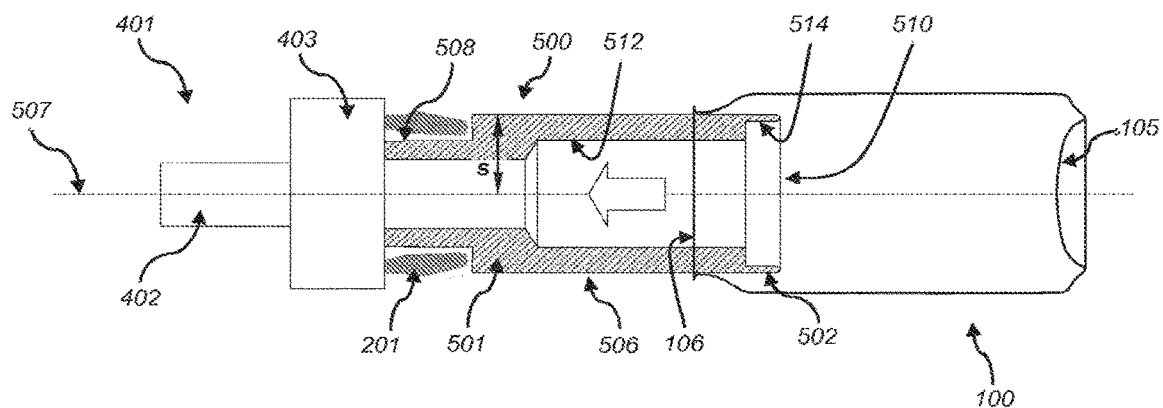
FIG. 6A shows a holding device comprising the gripper ring of FIG. 1 and the base support element of FIG. 5 in an unloaded state.
Figure 6B:
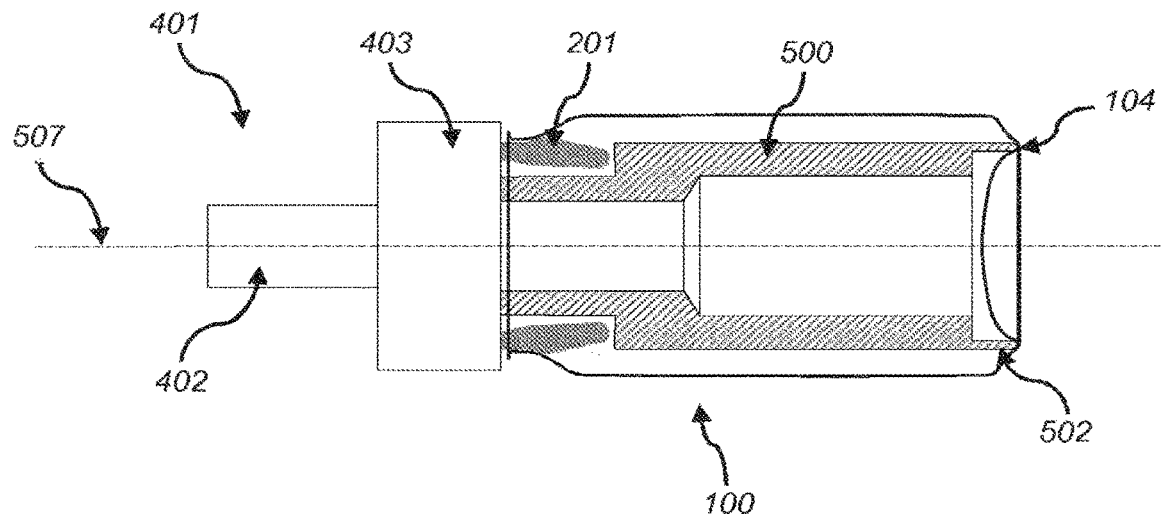
FIG. 6B shows the holding device of FIG. 6A in a loaded state.

In addition to the gripper ring 200, some embodiments of the invention also comprise a base support element comprising a base support insert 500 (shown in FIGS. 5, 6A and 6B) that acts to support the container 100 and to further improve the alignment between the axis 407 of the mandrel 401 and the axis 107 of the container 100. The use of the base support insert 500 is especially advantageous in the case where a more precise alignment between the container axis 107 and the mandrel axis 402 is required than is provided by the abutting of the container flange 103 with the mandrel shoulder 404 (for example, when the flange portion 103 has been misshapen in the container manufacturing process).

The base support insert 500 provides additional support to the container 100 by locating with the base ring 104 of the container such that a portion of the insert 500 is disposed between the main body 101 of the container 100 and the concave domed base 105 of the container 100. Usually the base ring 104 is accurately located coaxially with respect to the cylindrical body of the container 100 in the container forming process, and provides a reliable feature for the support insert 500 to locate with at the base of the container.

The base support insert 500 is substantially cylindrical in shape with a longitudinal axis 507 and an annular cross-section. The insert 500 comprises a main body 501 comprising a first portion 503 with a substantially cylindrical outer surface 506 and a narrower second portion 504 with an outer surface 508 that is cylindrical, tapered or a combination of both. The outer surface 506 of the first portion 503 has a radius, s, that is substantially the same as the radius, b, of the base ring 104 of the container 100. The first portion 503 of the main body 501 ends at a first opening 510 and the second portion 504 of the main body 501 ends at a second opening 511. The main body 501 is substantially hollow, having a continuous path through its interior defined by the inner surface 512 of the main body 501 and that passes from the first opening 510 to the second opening 511. The continuous path through the interior of the base support insert 500 allows gas to be driven or drawn through the extent of the main body 501.

At the first opening 510, the main body 501 comprises an annular rim 502. The annular rim 502 has an outer radius, s, that is the same as the outer radius of the first portion 503 of the main body 501, but has an inner surface 514 that has a greater radius than the inner surface 512 of the first portion 503 of the main body 501. The annular rim 502, therefore, has a narrower thickness than the first portion 503 of the main body 501. The outer radius and the thickness of the annular rim 502 are chosen to be matched to the outer radius and thickness of the base ring 104 of the container 100, such that the base ring 104 of the container 100 will locate onto the annular rim 502 of the insert 500 when a container 100 is pushed fully on to the insert 500, thereby causing the annular rim 502 to slot into the base ring 104 between the main body 101 of the container 100 and the concave domed base 105 of the container 100.

The length of the base support insert 500, from the shoulder 404 of the mandrel head 403 to the end of the rim 502, is chosen to be slightly greater (typically by around 0.5 to 1 mm) than the internal height of the container 100 (that is, the distance from the base ring 104 to the flange 103).

In use, the base support insert 500 is mounted on the rotatable mandrel 401 of FIGS. 4A and 4B and disposed within, and coaxial with, the gripper ring 200. The outer surface 508 of the second portion 504 of the base support insert 500 has a narrower radius than the inner radius of the gripper ring 200, thereby allowing the gripper ring 200 to be disposed around the second portion 504 of the base support insert 500 without contacting its outer surface 508. The narrower radius of the second portion 504 of the base support also provides a cavity into which the gripper ring 200 may be compressed when a container 100 is pushed onto the holding device, As the container 100 is loaded onto the mandrel 401, the base support insert 500 enters the opening 106 of the container 100 first, followed by the gripper ring 200. As is described with reference to FIGS. 4A and 4B the gripper ring 200 exerts an axial force on the container 100 that acts to pull the container 100 further onto the gripper ring 200. In contrast to the embodiment of FIGS. 4A and 4B, the axial motion of the container 100 onto gripper ring 200 is stopped due to the annular rim 502 of the base support insert 500 contacting the base ring 104 of the container 100, rather than the flange 103 of the container 100 abutting the shoulder 404 of the mandrel 401. This occurs due to the relative length of the base support insert 500 in comparison with the height of the container 100, as described above.

In the embodiments of FIGS. 4A and 4B and FIGS. 6A and 6B, the containers 100 may be loaded onto the holding device by any convenient method. Preferably, a container 100 is conveyed by gravity or a conveying belt to a loading station (not shown) at which a pneumatically actuated plunger is arranged to provide an axial force to the container 100 by pushing against the base of the container. The pneumatically actuated plunger pushes the container 100 onto the holding device until the end stop is reached. The plunger is withdrawn and the container 100 is retained on the holding device by the action of the gripper ring 200.

Figure 7:
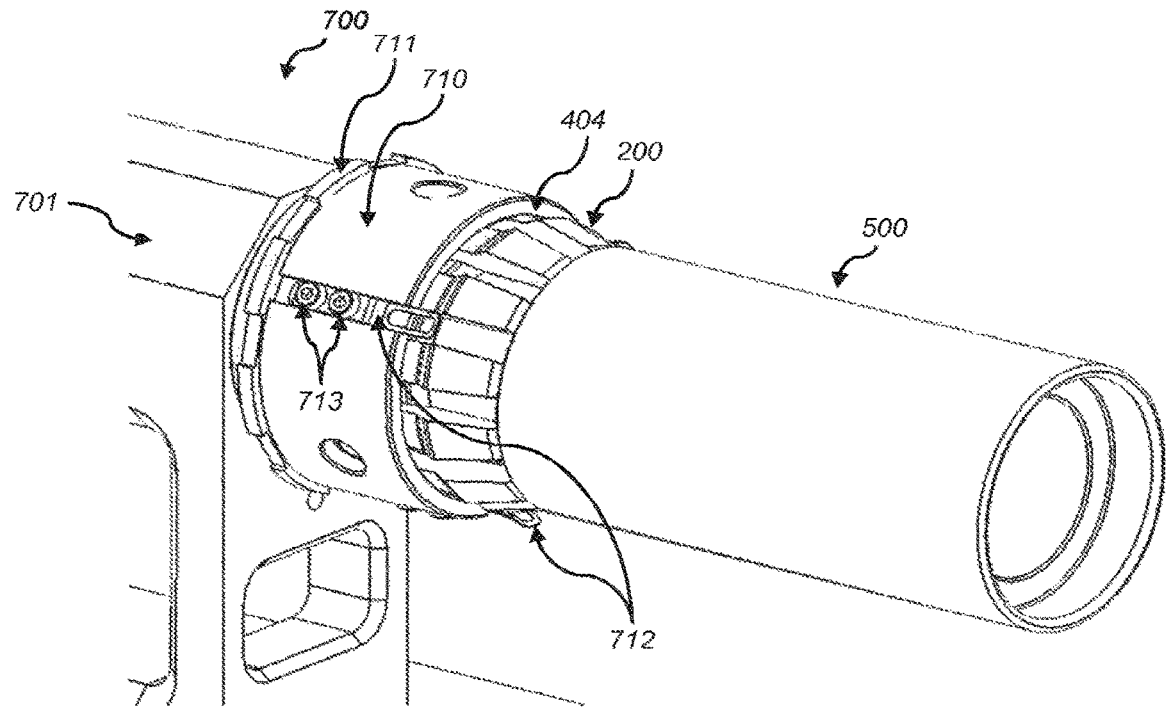
FIG. 7 shows a carrying device comprising the holding device of FIGS. 6A and 6B.
Figure 8:
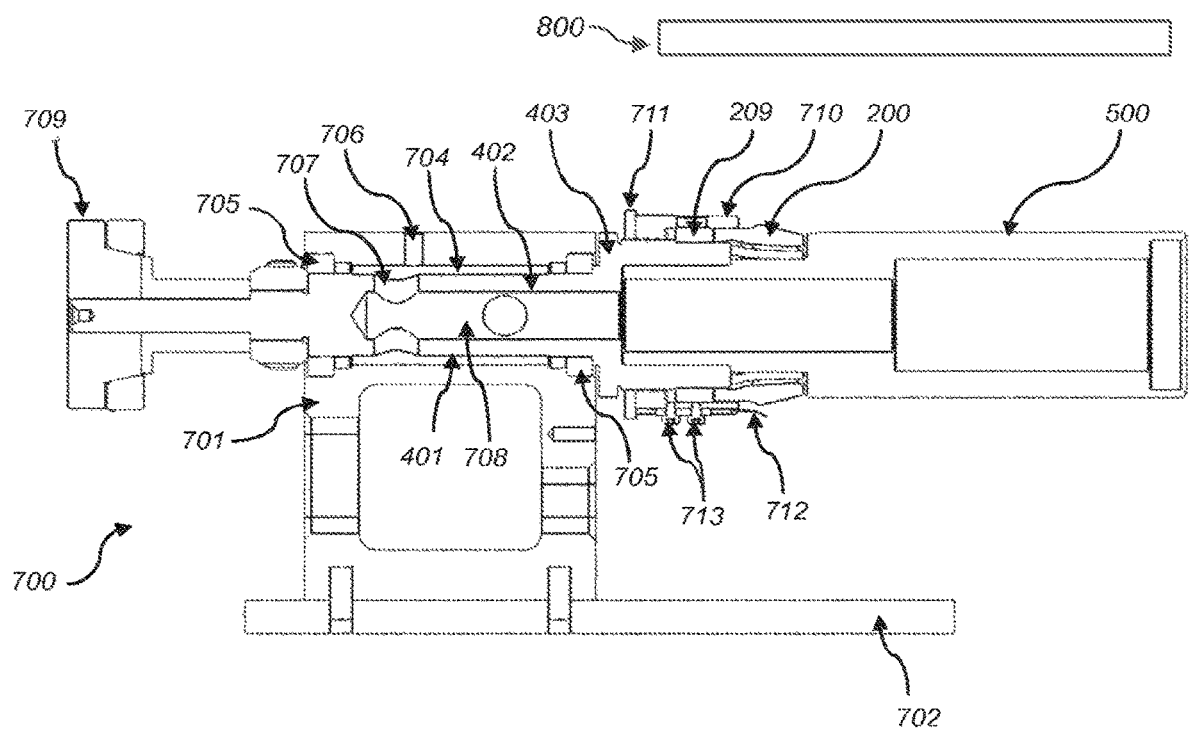
FIG. 8 shows a cross-sectional view of the carrying device of FIG. 7.

FIGS. 7 and 8 show an example of a container carrying device 700 comprising a holding device comprising a gripper ring 200 and a base support insert 500. The container carrying device 700 is adapted to carry containers 100 between a sequence of processing stations (such as a printing station 800 shown in FIG. 8) forming part of a printing apparatus. The container carrying device 700 is also adapted to unload containers using compressed gas.

In the shown embodiment, the gripper ring 200 is secured to a mandrel head 403 of a mandrel 401 using screws (not shown) that pass through the holes 209 in the gripper ring and thread into the mandrel head 403. The base support insert 500 is secured to the mandrel head 403 by inserting it into an open centre of the mandrel head 403 into which the narrower second portion 504 of the insert 500 is a push fit.

The mandrel head 403 is integrally formed with a hollow mandrel shaft 402 that extends through an opening 704 in an upper body 701 of the container carrying device 700. The mandrel 401 terminates on the opposite side of the upper body 701 at a driven disc 709 that is configured to couple with matching driving discs (not shown) that are configured to rotate the mandrel 401 at various processing stations.

An adjustable shoulder ring 710 is included in this embodiment to allow the axial position of the shoulder 404 to be adjusted with respect to the gripper ring. The shoulder ring 710 is threaded onto the mandrel head 403 and its position fixed by a lock ring 711 also threaded onto the mandrel head 403. The position of the shoulder 404 may thereby be set to act as an end-stop for the container flange if the insert 500 is not used, or moved clear of the container flange 103 in the case when the insert 500 is used to support the base of the container 100.

Also shown in FIGS. 7 and 8 are one or more earthing contacts 712. Each earthing contact 712 is attached by two screws 713 to the shoulder ring 710 and extends in an axial direction towards a container loaded on the holding device. The earthing contact 712 is arranged so that it makes contact with the outside of the container flange 103 when the container is inserted onto the holder, and ensures a metal container will remain at earth potential while attached to the carrying device 700 and will not become charged by any of the processing it undergoes.

The upper body 701 of the container carrying device 700 comprises an orifice 706 for compressed gas to be supplied into the opening 704 of the upper body 701. The hollow mandrel shaft 402 comprises at least one gas channel 707 which allows compressed gas provided through the orifice 706 to pass into the interior 708 of the hollow mandrel shaft 402. The hollow mandrel shaft 402 is open at the head end of the mandrel 401, which is connected to the opening 511 of the second portion 504 of the base support element 500. A continuous path is thereby provided between the orifice 706 and the opening 510 at the annular rim 502 of the base support element 500.

The mandrel shaft 402 is mounted to the upper body 701 of the carrying device 700 on bearings 705 that allow the mandrel 401 to rotate freely with respect the upper body of the carrying device 700.

The carrying device 700 comprises a base 702 which mounts via linear bearings (not shown) to a fixed track (not shown) along which the carrying device 700 is able to be moved. This allows the carrying device 700 to be moved between processing stations, such as loading/unloading stations, inspection stations, printing stations, coating stations and drying stations, at which various processes are performed on the container 100. Preferably, a plurality of carrying devices 700 are disposed on a fixed track, with each carrying device 700 being independently moveable with respect to the track and with respect to each other.

A container 100 may be unloaded from the holding device using compressed gas supplied through the orifice 706 from a compressed gas source (not shown).

When a container 100 is to be removed from the carrying device 700, the carrying device 700 is brought into the vicinity of a source of compressed gas and stopped. The source of compressed gas is coupled to the orifice 706 of the carrying device 700, after which a burst of compressed gas is provided into the orifice 706. The compressed gas increases the pressure in the interconnected volume formed by the interior of the mandrel 401 and the base support insert 500. The volume and pressure of the compressed gas supplied into the orifice 706 is chosen so that the increased pressure acting on the domed base 105 of the container 100 results in a displacing axial force sufficient to overcome the retaining axial force provided by the gripper ring 200, thus disengaging the container 100 from the gripper ring 200. Continued supply of compressed gas via the orifice 706 into the internal volume of the container will create a further axial force that pushes the container off of the support element 500.

While the example of FIGS. 7 and 8 comprise a base support element 500, the operation of the container carrying device 700 is substantially the same if a base support element 500 is not used. In this case when a container is to be removed from the carrying device 700, the same burst of compressed gas is provided to the orifice 706, causing the gas pressure within the container to increase and generating a force that acts axially between the container 100 and the shoulder 404 to disengage the container from the gripper ring 200. The pressure, volume and supply rate of compressed gas is chosen such that, although the contact between the flange 103 of the container 100 and the shoulder 404 does not create a gastight seal, sufficient momentum may be imparted to the container to disengage it fully from the gripper ring 200.

Connection to a compressed gas source is typically only required at positions on a printing apparatus where a container 100 is required to be unloaded, e.g., at an inspection station where containers 100 that fail inspection are ejected, or at an unloading station where containers 100 are removed from the apparatus once printing has been performed. Connection to a compressed gas source can be achieved via a coupling device located in the relevant processing station.

A preferred coupling device (not shown) comprises a nozzle mounted on a pneumatic cylinder that can move the nozzle axially over a short distance (a few millimetres) in order to bring it into mating contact with the orifice 706 on the upper body 701 of the container carrying device 700. An O-ring seal is provided on the mating face of the nozzle to ensure an gas-tight seal between the nozzle and the orifice 706 when mated. The compressed gas at the nozzle is controllable by a solenoid valve operated from a controller.

Containers are typically unloaded at relevant processing stations onto a conveyor or retaining device which catch and retain the container 100 using suction acting on the outside surface of the base of the container 100.

The invention claimed is:

1. A printing system for printing on an outer surface of a tubular object, the printing system comprising:
   at least one printing station for printing on the outer surface of the tubular object; and
   at least one holding device for holding the tubular object during a printing process, the at least one holding device comprising:
   a substantially annular gripper ring adapted to be partially inserted into the tubular object, the gripper ring comprising an annular base and a resilient radially compressible portion configured to securely engage with an inner surface of the tubular object, wherein the resilience of the radially compressible portion causes the radially compressible portion to exert a radially outward mechanical restoring spring force when compressed, and wherein the radially compressible portion of the gripper ring comprises a plurality of fingers that extend axially from the annular base, whereby radial compression of the plurality of fingers causes each of the fingers to bend towards a central axis of the gripper ring.

2. The printing system of claim 1, wherein each of the plurality of fingers comprises a leading portion having an outer radius that tapers from a maximum radius at a boundary region to a minimum radius at its end and shaped such that, when an opening of a tubular object is axially pushed over the leading portion, a force exerted by the opening of the tubular object on the leading portion causes the radially compressible portion to be progressively compressed.

3. A holding device for holding a necked tubular object, the holding device comprising:
   a substantially annular gripper ring, the gripper ring comprising an annular base and a plurality of fingers that extend axially from the annular base, wherein each of the plurality of fingers comprises:
   a first portion extending axially from base of the gripper ring up to a boundary region, and
   a second portion extending axially from the first portion and connected to the first portion at the boundary region; and
   wherein, in its rest position, a maximum outer radius of each finger occurs at the boundary region between the first portion and the second portion such that, when an opening of a necked tubular object is axially pushed over the gripper ring, a force exerted by the opening of the necked tubular object on the second portion of each finger causes each finger to be progressively bent inwards towards the axis of the gripper ring until the opening of the necked tubular object has passed over the boundary region, whereupon each finger resiliently springs radially outwards such that an outer surface of the first portion contacts an inner surface of the necked tubular object, thereby providing a holding force for holding the necked tubular object onto the gripper ring.

4. The holding device of claim 3, wherein, in its rest position, the front of the gripper ring is tapered whereby an outer radius of the second portion of each finger decreases in an axial direction from a maximum outer radius at the boundary region to a minimum outer radius at its end.

5. The holding device of claim 3, wherein, the gripper ring is necked whereby, in its rest position, an outer radius of the first portion of each finger varies in an axial direction from a minimum outer radius adjacent to the base to a maximum outer radius at the boundary region.

6. The holding device of claim 3, wherein the outer surface of the first portion of each of the plurality of fingers is shaped such that engagement with an inner surface of the necked tubular object produces a force having an axial component that urges the necked tubular object towards the base of the gripper ring.

7. The holding device of claim 3, wherein the first and second portions of each finger are integrally formed.

8. The holding device of claim 3, wherein the gripper ring is mounted on a rotatable mandrel, with the gripper ring being coaxial with an axis of rotation of the rotatable mandrel.

9. The holding device of claim 8, the rotatable mandrel further comprising an adjustable end-stop against which a rim of the necked tubular object is held by the axial component of the force that urges the necked tubular object towards the base of the gripper ring.

10. The holding device of claim 8, wherein the rotatable mandrel further comprises:
    an interior axial channel in fluid communication with an opening in the annular base of the gripper ring; and
    a gas inlet channel connecting the interior axial channel to the outside of the rotatable mandrel, thereby allowing compressed gas to be provided into the rotatable mandrel via the gas inlet channel in order to produce a displacing pressure at the base of the necked tubular object to eject the necked tubular object from the gripper ring.

11. The holding device of claim 3, further comprising a base support element disposed coaxially within the gripper ring, the base support element comprising a circular rim configured to slot into a circular channel at the base of the necked tubular object.

12. The holding device of claim 11, wherein the base support element is mounted on a rotatable mandrel, with the circular rim of the base support element being coaxial with an axis of rotation of the rotatable mandrel, and wherein the rotatable mandrel further comprises:
    an interior axial channel in fluid communication with a first opening of the base support element; and
    a gas inlet channel connecting the interior axial channel to the outside of the rotatable mandrel, thereby allowing compressed gas to be provided into the rotatable mandrel via the gas inlet channel in order to produce a displacing pressure at a second opening of the base support element to displace the necked tubular object.

13. The holding device of claim 11, wherein the base support element is mounted on a rotatable mandrel, with the circular rim of the base support element being coaxial with an axis of rotation of the rotatable mandrel.

14. The holding device of claim 11, wherein the base support element comprises a hollow cylindrical main body having a first opening at a first end and a second opening at a second end, wherein the second opening is defined by the circular rim.

15. The holding device of claim 3, wherein the necked tubular object is a necked metal monobloc container.

16. The holding device of claim 3, wherein the necked tubular object is a necked multipart container.

17. The holding device of claim 3, wherein the necked tubular object is a plastic container comprising an integrated neck portion and closed base.

18. The holding device of claim 3, wherein the holding device forms part of a carrying device configured to move objects between printing stations in a printing system.

19. The holding device of claim 18, wherein the holding device is one of a plurality of holding devices that each form part of one of a plurality of carrying devices, each of which is configured to be independently moved between printing stations in the printing system.

20. A method of loading a necked tubular object onto a holding device, the holding device comprising: a substantially annular gripper ring, the gripper ring comprising an annular base and a plurality of fingers that extend axially from the annular base, wherein each of the plurality of fingers comprises: a first portion extending axially from base of the gripper ring up to a boundary region, and a second portion extending axially from the first portion and connected to the first portion at the boundary region; wherein, in its rest position, a maximum outer radius of each finger occurs at the boundary region between the first portion and the second portion such that, when an opening of a necked tubular object is axially pushed over the gripper ring, a force exerted by the opening of the necked tubular object on the second portion of each finger causes each finger to be progressively bent inwards towards the axis of the gripper ring until the opening of the necked tubular object has passed over the boundary region, whereupon each finger resiliently springs radially outwards such that an outer surface of the first portion contacts an inner surface of the necked tubular object, thereby providing a holding force for holding the necked tubular object onto the gripper ring;
    the method comprising:
    axially pushing the necked tubular object onto the gripper ring of the holding device with the necked tubular object being held in axial alignment with the gripper ring.

21. A printing system for printing on an outer surface of a tubular object, the printing system comprising:
    at least one printing station for printing on the outer surface of the tubular object; and
    at least one holding device for holding the tubular object during a printing process, the at least one holding device comprising:
    a substantially annular gripper ring adapted to be partially inserted into the tubular object, the gripper ring comprising an annular base and a resilient radially compressible portion configured to securely engage with an inner surface of the tubular object, wherein the resilience of the radially compressible portion causes the radially compressible portion to exert a radially outward mechanical restoring spring force when compressed, wherein the gripper ring further comprises a plurality of fingers that extend axially from the annular base, wherein each of the plurality of fingers comprises:
        a first portion extending axially from base of the gripper ring up to a boundary region, and
        a second portion extending axially from the first portion and connected to the first portion at the boundary region; and
    wherein, in its rest position, a maximum outer radius of each finger occurs at the boundary region between the first portion and the second portion such that, when an opening of a necked tubular object is axially pushed over the gripper ring, a force exerted by the opening of the necked tubular object on the second portion of each finger causes each finger to be progressively bent inwards towards the axis of the gripper ring until the opening of the necked tubular object has passed over the boundary region, whereupon each finger resiliently springs radially outwards such that an outer surface of the first portion contacts an inner surface of the necked tubular object, thereby providing a holding force for holding the tubular object onto the gripper ring.

22. A method of unloading a necked tubular object from a holding device, the holding device comprising a substantially annular gripper ring adapted to be partially inserted into the necked tubular object, the gripper ring comprising a resilient radially compressible portion configured to securely engage with an inner surface of the necked tubular object, wherein the resilience of the radially compressible portion causes the radially compressible portion to exert a radially outward mechanical restoring spring force when compressed; the method comprising:

provided compressed gas into an inside of the necked tubular object, thereby causing an increased pressure on a base of the necked tubular object sufficient to overcome a retaining force provided by the gripper ring.

\* \* \* \* \*